US005697991A

United States Patent [19]
Frazer

[11] Patent Number: 5,697,991
[45] Date of Patent: Dec. 16, 1997

[54] GLASS TREATMENT COMPOUND

[75] Inventor: Richard D. Frazer, Williamsville, N.Y.

[73] Assignee: Crescent Marketing, Inc.

[21] Appl. No.: 705,411

[22] Filed: Aug. 29, 1996

[51] Int. Cl.$^6$ ...................................................... C09K 3/18
[52] U.S. Cl. .......................... 51/306; 106/2; 106/11; 106/287.11; 106/287.12; 106/287.13
[58] Field of Search ............................. 51/306; 106/2, 106/3, 11, 287.11, 287.12, 287.13

[56] References Cited

U.S. PATENT DOCUMENTS

| | | | |
|---|---|---|---|
| 3,579,540 | 5/1971 | Ohlhausen | 523/169 |
| 3,998,643 | 12/1976 | Liddle | 106/2 |
| 4,076,868 | 2/1978 | Roth et al. | 427/348 |
| 4,308,060 | 12/1981 | Talbot | 106/9 |
| 5,057,151 | 10/1991 | Schuster et al. | 106/2 |
| 5,073,195 | 12/1991 | Cuthbert et al. | 106/2 |
| 5,209,775 | 5/1993 | Bank et al. | 106/2 |
| 5,258,063 | 11/1993 | Cifuentes et al. | 106/3 |
| 5,425,804 | 6/1995 | Shinohara et al. | 106/2 |
| 5,443,604 | 8/1995 | Stowell | 51/307 |
| 5,534,265 | 7/1996 | Fowler et al. | 424/489 |

*Primary Examiner*—Deborah Jones
*Attorney, Agent, or Firm*—Hodgson, Russ, Andrews, Woods & Goodyear LLP

[57] ABSTRACT

An improved treatment compound for rendering glass surfaces and the like water repellant, is described. The treatment compound comprises a mineral acid, a solvent, a mild abrasive constituent and an alkyl polysiloxane. The polysiloxane is a film former while the mild abrasive serves to enhance dirt and grit removal, smooth the water repellant film and indicate the area of application.

18 Claims, No Drawings

GLASS TREATMENT COMPOUND

BACKGROUND OF THE INVENTION

1. Field of the Invention

The present invention generally relates to a treatment compound, and more particularly to a treatment compound useful on glass surfaces such as window glass and the like to provide a protective film that functions as an effective shield against rain, snow, sleet, ice, road spray, bugs, tar, grime and the like.

2. Prior Art

It is known to apply an organic polysiloxane based compound to nonporous surfaces such as glass, metals, ceramics and painted or unpainted plastics to render them water repellant. Such a treatment compound comprising an alkyl polysiloxane, a mineral acid and a suitable solvent is described in U.S. Pat. No. 3,579,540 to Ohlhausen. While this compound is suitable for its intended purpose, it is often difficult to determine whether the prior art treatment compound has been applied to all of the surface intended to be protected. Even when care is taken to ensure that the treatment compound has been applied over all of the surface to be protected, the Ohlhausen compound can be coated in uneven thicknesses which causes streaking and distorted vision through glass. Also, a major portion of the Ohlhausen treatment compound is an alcohol based solvent which in addition to solubilizing the organic polysiloxane serves to help remove various dirt and foreign materials from the treated surface. However, tests indicate that the alcohol is deficient in removing some forms of particularly hard and ground in foreign materials such as dried insects from windshields and the like.

The present invention is an improved treatment compound. In providing all of the advantages and benefits of the prior art organic polysiloxane based treatment compound, particularly on glass surfaces and the like, the present treatment compound additionally includes a mild abrasive that readily indicates to the user where the compound has been applied and which areas still require an application. The mild abrasive does not harm the glass surface but, in fact, it enhances smooth and even distribution of the treatment compound and aids in grit removal. And, upon drying, the mild abrasive is easily rubbed off of the treated surface to leave an enhanced water repellant luster to the glass.

SUMMARY OF THE INVENTION

The present invention is directed to an improved treatment compound for rendering glass surfaces and the like water repellant. The present glass treatment compound comprises a mineral acid, a solvent, an abrasive constituent and an alkyl polysiloxane having the general formula:

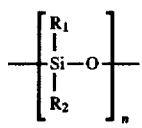

wherein n is an integer greater than 1, $R_1$ is a lower alkyl radical containing from 1 to 7 carbon atoms, and $R_2$ is selected from the group consisting of hydrogen, a lower alkyl radical containing from 1 to 7 carbon atoms and an aryl radical containing about 6 carbon atoms.

DETAILED DESCRIPTION OF THE INVENTION

The present invention is an improvement in the treatment of glass surfaces and the like to render such surfaces water repellant. A preferred treatment compound according to the present invention includes a mineral acid, a solvent, a mild abrasive and at least one organic polysiloxane compound. The latter compounds are film formers having a viscosity in the range of about five to as high as several million centistokes, preferably about 100 to about 10,000 centistokes. The organic polysiloxane compounds provide a strongly adherent and durable water repellant film to the treated glass surface while the mild abrasive acts to smooth the polysiloxane compound to prevent distorted vision caused by streaking. The mild abrasive further acts to abrade away any particularly hardened and dried dirt and foreign material that may be contacted to the glass surface.

The preferred organic polysiloxane used in the present treatment compound is an alkyl polysiloxane having the general formula:

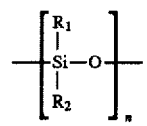

wherein n is an integer greater than 1, $R_1$ is a lower alkyl radical containing from 1 to 7 carbon atoms, and $R_2$ is selected from the group consisting of hydrogen, a lower alkyl radical containing from 1 to 7 carbon atoms and an aryl radical containing about 6 carbon atoms. If desired, the treatment compound can include a mixture of polysiloxanes having differing viscosities such as a relatively low viscosity polysiloxane and a relatively high viscosity polysiloxane.

Examples of suitable alkyl polysiloxanes include dimethyl polysiloxane, methyl polysiloxane, diethyl polysiloxane, methylphenyl polysiloxane, methylethyl polysiloxane, diphenyl polysiloxane, diphenyl silandiol and copolymers of any two of more of them. Polysiloxane-oxyalkylene block copolymers may also be used.

These alkyl polysiloxane are commercially available in various molecular weight ranges. Although the particular species of the alkyl polysiloxane and its molecular weight most suited for a particular application must be determined from each set of circumstances, generally a value for n of about 5 to 900 is preferred. For example, with respect to dimethyl polysiloxane, a molecular weight range of about 400 to 60,000 is desirable, and more particularly a molecular weight of about 1,100 (corresponding to a value of n of about 15) is preferred.

An important constituent of the present invention is the inclusion of a mild abrasive with the alkyl polysiloxane. The abrasive is preferably added to the compound in a finely divided, powdered form and as such, is mild enough to avoid scratching the treated surface. On the other hand, the mild abrasive constituent must provide for removal of dirt and dried and hardened foreign materials such as grease, insects, tar and the like. Suitable abrasives have a surface area of less than about 50 $m^2$/gram and include aluminum silicate, diatomaceous earth, silica, pumice, fuller's earth, bentonite, tripoli, hydrated calcium silicate, chalk, colloidal clay, magnesium oxide, red iron oxide and tin oxide, and mixtures thereof. A preferred abrasive is diatamaceous earth present in the treatment compound in a range of about 0.5% to 3% by weight, and more preferably at about 1%, by weight.

In addition to enhancing removal of dirt and grit and the like from the treated surface, the mild abrasive serves to level or even out the thickness of the alkyl polysiloxane coated on the treated surface. This characteristic of the present invention is important for improved luster and water repellency to the treated surface. Without the abrasive, it is difficult to administer an evenly dispersed application to the treated surface. An uneven coating results in streaking, distorted vision and areas with insufficient compound to provide proper water repelling. Finally, the mild abrasive leaves a mild haze on the treated surface once the solvent evaporates to indicate those areas that have been treated and those that still require an application. Then, the dried compound is wiped off the surface with light rubbing to leave a smooth, glossy finish to the treated surface.

Mineral acids which are suitable for use with the present treatment solution include sulfuric acid, phosphoric acid, aromatic sulfonic acids, aliphatic sulfonic acids and hydrochloric acid. Although the amount of acid which can be used in the treatment compound of the present invention is variable, an amount of acid equivalent to about 2.5% to 30% based on the weight of the polysiloxane in the treating composition is preferred. It is particularly preferred that the acid constituent is equivalent to about 5% to 20%, by weight, of the polysiloxane. Generally, about 1%, by weight, of acid, based on the weight of the composition, is preferred.

However, when an extremely small amount of the alkyl polysiloxane is used in the composition, for example about 2% by weight, then the required relative amount of acid is somewhat greater than indicated. Thus, if 2% dimethyl polysiloxane is mixed with isopropyl alcohol as its solvent, about 1% acid based on the weight of the overall composition, or 50% based on the weight of the polysiloxane, is needed to activate the composition for the purpose of providing a suitable glass treatment compound according to the present invention.

It is an important aspect of the present invention that the alkyl polysiloxane is admixed with a variety of solvents, diluents and extenders. Such solvents, diluents and extenders are much less expensive than the alkyl polysiloxanes, and permit tailoring of the treatment compound to meet a large variety of application requirements. In addition, solvents, diluents and extenders make the treatment compound of the present invention easier to apply, more stable in storage and safer to handle. The solvents, diluents and extenders which may be used to formulate the treatment compound of the present invention include alcohols, chlorinated-hydrocarbons, ethers, ketones, esters, aromatic hydrocarbons, water, colloidal pyrogenic silicas and clays. Examples of such solvents and diluents are benzene, butyl acetate, carbon tetrachloride, ethyl ether, gasoline, hexane, isopropyl alcohol, methyl ethyl ketone, mineral spirits, perchloroethylene, toluene, xylene, and mixtures thereof.

The suitability of a solvent depends in part on the particular alkyl polysiloxane used and the intended application. Additionally, depending on the intended application, the amount of solvent used in a treatment compound according to the present invention can vary widely. However, to obtain the optimum balance with respect to water repellency, adhesion to the treated substrate, economy, durability and ease of application, an amount of solvent of between about 75% to 95%, by weight, of the final treatment compound is preferred. In that case, an amount of solvent, for example, isopropyl alcohol, equal to about 80% to 90%, by weight, of the final treatment compound is preferred. Thus, for example, for general treatment of glass surfaces isopropyl alcohol is the preferred solvent.

Although high molecular weight, extremely viscous, dimethyl polysiloxanes are not easily solubilized in isopropyl alcohol, dimethyl polysiloxanes having a viscosity of 5 to 1000 centistokes can be easily solubilized by first mixing the acid with the alcohol-based solvent to thereby form an intermediate ester. To this admixture is added the alkyl polysiloxane and the abrasive constituent. The organic polysiloxane and the abrasive can be individually added to the intermediate ester, or they can be mixed together and the resulting polysiloxane/abrasive mixture is added to the intermediate ester.

The composition of the present invention can be applied to glass surfaces by any conventional means, such as by spraying, brushing, wiping and other coating techniques. To insure complete coverage of the substrate, it is preferred to lightly wipe the coated surface with a cloth after the composition is applied. To obtain a surface with an optically clear film coated thereon, excess treatment compound can be removed by wiping the glass with a clean, dry cloth. The treated surface is finally polished to remove the mild abrasive and to provide the glass with a high degree of luster.

The method of treating nonporous substrates by the method of the present invention is extremely useful for treating a variety of glass surfaces. This is particularly advantageous in the case of side and rear automobiles windows through which vision is usually impaired and restricted during a rainstorm. Also, the windshields of automobiles, boats and airplanes can be treated with the present treatment compound to render them water repellent. By preventing wetting, a windshield provided with a treatment of the present compound presents a clear view of the road to the driver. Even during a heavy rainstorm and with the use of wipers, a windshield treated with the present compound provides noticeably improved vision. Windows including windshields coated with the compound of the present invention are also easier to clean of various dirt, grease, bugs and other foreign materials than other windshields. This is because the polysiloxane-treated windshield presents a surface on which foreign materials does not readily adhere.

The present invention glass treatment compound also benefits the cleaning of windows and the like left outdoors overnight. During the winter months, frost and ice precipitated on automobile windows is easily removed by brushing and light scraping.

It is appreciated that various modifications to the inventive concepts described herein may be apparent to those skilled in the art without departing from the spirit and the scope of the present invention defined by the hereinafter appended claims.

What is claimed is:

1. A solution for use in treating a glass surface to form a protective coating thereon, which comprises:

a) an alkyl polysiloxane having the general formula:

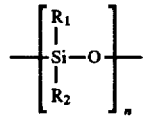

wherein n is an integer greater than 1, $R_1$ is a lower alkyl radical containing from 1 to 7 carbon atoms, and $R_2$ is selected from the group consisting of hydrogen, a lower alkyl radical containing from 1 to 7 carbon atoms and an aryl radical containing about 6 carbon atoms;

b) an abrasive constituent selected from the group consisting of aluminum silicate, diatomaceous earth, silica, pumice, fuller's earth, bentonite, tripoli, hydrated calcium silicate, chalk, colloidal clay, magnesium oxide, red iron oxide and tin oxide, and mixtures thereof;

c) a solvent; and d) a mineral acid that together with the solvent aids in solubilizing the alkyl polysiloxane.

2. The solution of claim 1 wherein the abrasive constitute is present in a range of between about 0.5% to 3%, by weight.

3. The solution of claim 1 wherein the alkyl polysiloxane is selected from the group consisting of methyl polysiloxane, dimethyl polysiloxane, diethyl polysiloxane, methylethyl polysiloxane, methylphenyl polysiloxane, diphenyl polysiloxane, diphenyl silanediol, copolymers of any two or more of them and polysiloxane-oxyalkylene block copolymers.

4. The solution of claim 1 wherein n has a value of about 5 to 900.

5. The solution of claim 1 wherein n has a value of about 15.

6. The solution of claim 1 wherein the solvent is isopropyl alcohol.

7. The solution of claim 1 wherein the mineral acid is selected from the group consisting of sulfuric acid, phosphoric acid, aromatic sulfonic acids, aliphatic sulfuric acids and hydrochloric acid, and mixtures thereof.

8. The solution of claim 1 wherein the alkyl polysiloxane is present in a range of about 5% to 25%, by weight, the abrasive constituent is present in a range of about 1% to 3%, by weight, remainder comprising the solvent and the mineral acid.

9. The solution of claim 8 wherein the solvent is present in a range of about 75% to 95%, by weight, and the mineral acid is present in a range of about 0.5% to 5%, by weight.

10. The solution of claim 8 wherein the alkyl polysiloxane is present at about 10%, by weight, the abrasive constituent is present at about 1%, by weight, the solvent is present at about 88%, by weight, and the mineral acid is present at about 1%, by weight.

11. A method of treating a glass surface to form a protective coating thereon, comprising the step of:

a) mixing an alkyl polysiloxane with an abrasive constituent, a solvent and a mineral acid to thereby provide a treatment compound, wherein the alkyl polysiloxane has the general formula:

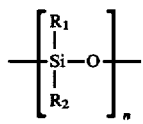

wherein n is an integer greater than 1, $R_1$ is a lower alkyl radical containing from 1 to 7 carbon atoms, and $R_2$ is selected from the group consisting of hydrogen, a lower alkyl radical containing from 1 to 7 carbon atoms and an aryl radical containing about 6 carbon atoms, and wherein the abrasive constituent is selected from the group consisting of aluminum silicate, diatomaceous earth, silica, pumice, fuller's earth, bentonite, tripoli, hydrated calcium silicate, chalk, colloidal clay, magnesium oxide, red iron oxide and tin oxide, and mixtures thereof;

b) applying the treatment compound to a glass surface to be protected to thereby wet the surface; and c) rubbing the compound treated glass surface to leave the protective coating on the glass.

12. The method of claim 11 including providing the abrasive constituent in the compound in a range of between about 0.5% to 3%, by weight.

13. The method of claim 11 wherein the alkyl polysiloxane is selected from the group consisting of methyl polysiloxane, dimethyl polysiloxane, diethyl polysiloxane, methylethyl polysiloxane, methylphenyl polysiloxane, diphenyl polysiloxane, diphenyl silanediol, copolymers of any two or more of them and polysiloxane-oxyalkylene block copolymers.

14. The method of claim 11 wherein the solvent is isopropyl alcohol.

15. The method of claim 11 wherein the mineral acid is selected from the group consisting of sulfuric acid, phosphoric acid, aromatic sulfonic acids, aliphatic sulfuric acids and hydrochloric acid, and mixtures thereof.

16. The method of claim 11 wherein the alkyl polysiloxane is present in the treatment compound in a range of about 5% to 25%, by weight, and the abrasive constituent is present in a range of about 1% to 3%, by weight, remainder comprising the solvent and the mineral acid.

17. The method of claim 16 wherein the solvent is present in the treatment compound in a range of about 75% to 95%, by weight, and the mineral acid is present in a range of about 0.5% to 5%, by weight.

18. The method of claim 16 wherein the alkyl polysiloxane is present at about 10%, by weight, the abrasive constituent is present at about 1%, by weight, the solvent is present at about 88%, by weight, and the mineral acid is present at about 1%, by weight.

* * * * *